United States Patent
Lo et al.

(10) Patent No.: US 12,315,263 B2
(45) Date of Patent: May 27, 2025

(54) DETECTION METHODS TO DETECT OBJECTS SUCH AS BICYCLISTS

(71) Applicant: PreAct Technologies, Inc., Herndon, VA (US)

(72) Inventors: Josh Lo, Herndon, VA (US); Keith Brendley, Herndon, VA (US); Kurt Brendley, Herndon, VA (US)

(73) Assignee: PreAct Technologies, Inc., Portland, OR (US)

( * ) Notice: Subject to any disclaimer, the term of this patent is extended or adjusted under 35 U.S.C. 154(b) by 506 days.

(21) Appl. No.: 17/863,061

(22) Filed: Jul. 12, 2022

(65) Prior Publication Data

US 2023/0017357 A1 Jan. 19, 2023

Related U.S. Application Data

(60) Provisional application No. 63/231,479, filed on Aug. 10, 2021, provisional application No. 63/220,904, filed on Jul. 12, 2021.

(51) Int. Cl.
| | |
|---|---|
| G06V 20/54 | (2022.01) |
| G06T 7/50 | (2017.01) |
| G06V 10/82 | (2022.01) |

(52) U.S. Cl.
CPC ............ *G06V 20/54* (2022.01); *G06T 7/50* (2017.01); *G06V 10/82* (2022.01); *G06T 2207/10028* (2013.01)

(58) Field of Classification Search
CPC .......... G06V 20/54; G06V 10/82; G06T 7/50; G06T 2207/10028; G06T 7/11; G06T 7/246; B60W 60/001; B60W 30/09; G01S 17/931; G06N 3/08
USPC ........................................................ 382/104
See application file for complete search history.

(56) References Cited

U.S. PATENT DOCUMENTS

2019/0318177 A1* 10/2019 Steinberg .............. G01S 7/4808
2020/0284883 A1* 9/2020 Ferreira ................ G01S 7/4914

* cited by examiner

*Primary Examiner* — Michael R Neff
(74) *Attorney, Agent, or Firm* — Nixon & Vanderhye P.C.

(57) ABSTRACT

To reliably detect an object such as a bicycle at increased range, an Advanced Driving Support System uses a deep neural network(s) to process an ambient (grey-scale) image into an object that is then tracked by a second range detection camera. Most objects of interest, such as bicycles and automobiles, are outfitted with one or more retroreflectors that are used to cue the neural network to the object of most interest. As the retroreflectors also tend to saturate the range detection camera, a method is used to manage the saturation and estimate the correct range to the object.

26 Claims, 12 Drawing Sheets

Flowchart

FIG. 1
Flowchart

FIG. 2A: Ambient light

FIG. 2B: Distance Image

FIG. 4A: Amplitude map

FIG. 4B: Distance map

FIG. 4C: 3D Point Cloud

FIG. 5: Amplitude map with many retroreflectors

FIG. 6: Point Cloud distorted by many retroreflectors

FIG. 7A: Distance without saturation compensation

FIG. 7B: Distance with saturation compensation

FIG. 8A: Point cloud without saturation compensation

FIG. 8B: Point cloud with saturation compensation

DETECTION METHODS TO DETECT OBJECTS SUCH AS BICYCLISTS

CROSS-REFERENCES TO RELATED APPLICATIONS

The present application claims benefit of U.S. Provisional Application No. 63/231,479 filed Aug. 10, 2021, and U.S. Provisional Application No. 63/220,904 filed Jul. 12, 2021, each of which is incorporated herein by reference in its entirety and for all purposes. This application relates to commonly-assigned copending U.S. application Ser. No. 16/883,679 filed May 26, 2020, also incorporated herein by reference.

STATEMENT REGARDING FEDERALLY SPONSORED RESEARCH OR DEVELOPMENT

N/A

FIELD

The technology herein relates to object detection using a combination of image processing and three-dimensional point-cloud data. The approach may be applied to methods and systems for automatically detecting objects such as a pedestrian or bicyclist from a certain distance away such as 20 meters.

BACKGROUND & SUMMARY

One of the requirements for Advanced Driving Support System (ADAS) applications is to be able to detect a bicyclist at a distance sufficiently far to enable avoidance or precrash applications such as launching external airbags. For example, a 20 m bicycle detection range would provide sufficient perception-reaction time for many applications.

For bicycle detection applications, the American Association of State Highway and Transportation Officials (AASHTO) Guide for the Development of Bicycle Facilities (p. 36) recommends a minimum design speed of 30 km/h (20 mi/h) for shared use paths. Another study (Characteristics of Emerging Road Users and Their Safety from US Department of Transportation—Federal Highway Administration [FHWA]) shows that the mean speed for bicyclists in this study was 17 km/h (11 mi/h), and the 85th percentile speed, 22 km/h (14 mi/h). Thus, the AASHTO value is higher than the speeds observed for most bicyclists.

The FHWA study also shows that recumbent bicyclists appear to be the critical user, as they had the highest mean (23 km/h (14 mi/h)) and 85th percentile (29 km/h (18 mi/h)) speeds. For all user types, the 85th percentile speed was less than 30 km/h (20 mi/h). Thus, the AASHTO value is higher than the speeds observed for most recumbent bicyclists.

TABLE 1

Typical speeds for various low speed road users

| USER TYPE | N | MEAN (km/h) | STD DEV (km/h) | 15TH PER (km/h) | 85TH PER (km/h) |
|---|---|---|---|---|---|
| Bicycle | 367 | 17 | 6 | 11 | 22 |
| Golf Cart | 5 | 16 | 4 | 12 | 19 |
| Hand Cycle | 38 | 14 | 7 | 8 | 19 |
| Inline Skates | 53 | 16 | 5 | 12 | 23 |
| Kick Scooter | 22 | 12 | 3 | 9 | 15 |

TABLE 1-continued

Typical speeds for various low speed road users

| USER TYPE | N | MEAN (km/h) | STD DEV (km/h) | 15TH PER (km/h) | 85TH PER (km/h) |
|---|---|---|---|---|---|
| Manual Wheelchair | 6 | 6 | 2 | 5 | 8 |
| Pedestrian | 38 | 7 | 2 | 5 | 10 |
| Power Wheelchair | 12 | 9 | 5 | 5 | 11 |
| Recumbent Bicycle | 24 | 23 | 7 | 18 | 29 |
| Segway | 4 | 15 | 2 | 14 | 17 |
| Skateboard | 10 | 13 | 5 | 8 | 20 |
| Stroller | 7 | 5 | 3 | 4 | 6 |
| Tandem | 3 | 19 | 6 | 15 | 22 |
| Other | 7 | 14 | 4 | 11 | 17 |

Perception-Reaction Time

In cases where the sensor-perception system would be used as a driver warning device, the reaction time of the driver must be taken into account.

The AASHTO Green Book (pp. 111-113) recommends a perception-reaction time of 2.5 seconds for motorists. It cites research by Johansson and Rumar, who found a mean reaction time of 0.66 seconds, after collecting data from 321 drivers who expected to apply their brakes. About 10 percent of drivers had reaction times of 1.5 seconds or longer. Also in that study, when drivers did not expect to apply their brakes, their reaction times increased by approximately 1.0 second. Based on that study and other research, the AASHTO Green Book concluded that a value of 2.5 seconds exceeds the 90th percentile perception-reaction time of all drivers and takes into account the additional time required for unexpected braking vs. expected braking. The AASHTO Guide for the Development of Bicycle Facilities (pp. 40-42) uses a perception-reaction time of 2.5 seconds.

The FHWA study measured the perception-reaction time of slow-speed road users with the following method: "The perception-reaction time was measured from when the STOP sign was displayed to when the participant started braking. At the upstream acceleration station, participants were told in advance that at some point along the course they might be presented with a STOP sign, and if so, they were to stop as quickly as is comfortable. (In fact, all participants were asked to stop.) In addition, "dummy" stop stations were set up to reduce the anticipation at a particular location."

The following table shows that the mean perception-reaction time for bicyclists was 0.9 seconds:

TABLE 2

Perception-reaction time of slow speed road users

| USER TYPE | N | MEAN (sec) | STD DEV (sec) | 85TH PER (sec) |
|---|---|---|---|---|
| Bicycle | 130 | 0.9 | 0.7 | 1.3 |
| Hand cycle | 32 | 0.9 | 0.6 | 1.2 |
| Inline skates | 20 | 1.2 | 0.5 | 1.4 |
| Kick scooter | 14 | 1.2 | 0.8 | 2.3 |
| Manual wheelchair | 8 | 1.1 | 0.3 | 1.5 |
| Power wheelchair | 6 | 0.8 | 0.5 | 1.3 |
| Recumbent bicycle | 6 | 0.8 | 0.3 | 1.0 |
| Segway | 5 | 1.1 | 0.6 | 1.5 |
| Other | 24 | 1.3 | 0.2 | 1.5 |

This is consistent with the mean reaction time of 0.66 seconds for motorists, as reported by Johansson and Rumar. To cover 95th percentile of bicyclist perception-reaction time is 0.9+2.5*0.7=2.3 seconds, which is consistent to the 2.5 seconds suggested by the AASHTO Green Book.

Bicyclist Detection Range

By adopting the AASHTO recommendations, the upper-bound bicycle speed is 30 km/h (8.33 m/s), and the bicyclist perception-reaction time is 2.5 seconds. Then the required detection range can be calculated as:

DetectionRange=8.33*2.3=20.83 m

Therefore, the 20 m bicyclist detection range requirement in the ADA application is reasonable.

Unfortunately, many current object detection algorithms do not meet these performance metrics. For example, some current object detectors are only able to identify a bicyclist from s shorter distance such as 10 m away. New detection and processing methods are needed to meet this object warning and reaction requirement.

DETAILED DESCRIPTION OF EXAMPLE NON-LIMITING EMBODIMENTS

A main difficulty in object detection for human-sized objects such as a bicyclist is that a bicyclist/person appears small in the image when he/she is located at 20 m away from the sensor. This is particularly true for sensors that develop a 3D point cloud, which tend to be much more limited in resolution than standard RGB cameras. This trade-off, however, is usually beneficial in that a 3D camera can provide direct distance measurements at a high frame rate, whereas a monocular RGB camera can infer only distance, normally using AI techniques such as neural networks that to date cannot operate at high frame rates.

Figure 1:
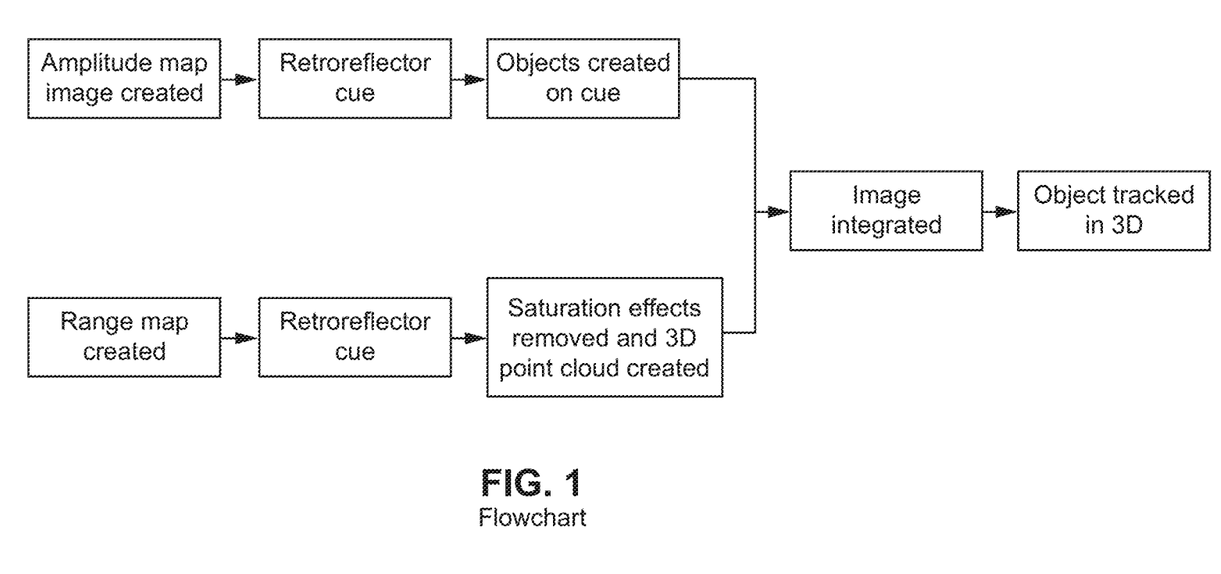
FIG. 1 shows an example flowchart.

The general approach follows the process flow shown in FIG. 1. Two cameras or a single camera with two different output types may be used. The output types are 1) an image in either gray-scale or RGB and 2) a point distance map as generated by a time-of-flight camera or similar method. The imagining camera can be said to generate an amplitude map, with no inherent distance measurements although others have created methodologies for inferring distance from such maps. Many of the objects of most interest, such as a car or bicycle, have retroreflective surfaces caused by items such as headlamps, taillamps, purpose-built retroreflectors, license plates, reflective tape and so forth. These serve as cues that there is an object of interest to both the amplitude and range maps. The amplitude map then uses various methodologies as described later to form an object containing the retroreflector. Methodologies concerning the range map, conversely, are focused more on removing the deleterious saturation effects caused by the retroreflectors before forming a 3D point cloud. These amplitude map containing defined objects is then merged with the corrected 3D point cloud to determine which points correspond to the object(s) of interest. These may then be tracked as defined objects.

The FIG. 1 image shows a bicyclist riding in the center of the image with a distance of 20 m away from the camera. Given that the 3D sensor resolution in this example is 320×240 and horizontal FOV=108 degrees, an adult bicyclist only occupies about 4 pixels wide when he/she is about 20 m away. In addition, the amplitude return of any object from 20 m away is generally weak and noisy. Therefore, the bicyclist blends into the background pixels and it is challenging to be isolated out reliably using only the sensor distance returns.

Fortunately, there are two extra pieces of information can be leveraged to detect a bicyclist from 20 m away. First, it is quite common that there are retroreflectors on either the bicycle or the clothing of the rider. In that case, due to its high amplitude return, the retroreflectors can in general be detected farther away. By detecting dynamic retroreflectors, we can at least identify potential threats approaching to the camera.

The amplitude map containing defined objects is then merged with the corrected 3D point cloud to determine which points correspond to the object(s) of interest. These may then be tracked as defined objects.

Use Retroreflector Information

A retroreflector can easily saturate the pixels it occupies and even bloom out to the neighboring pixels. From previous experience, the distance returns of the saturated pixels are erroneous, but their distance can be inferred from the neighboring pixels. By using the neighboring pixel information, distance information of the saturated pixels can be reconstructed as described below.

Figure 3A:
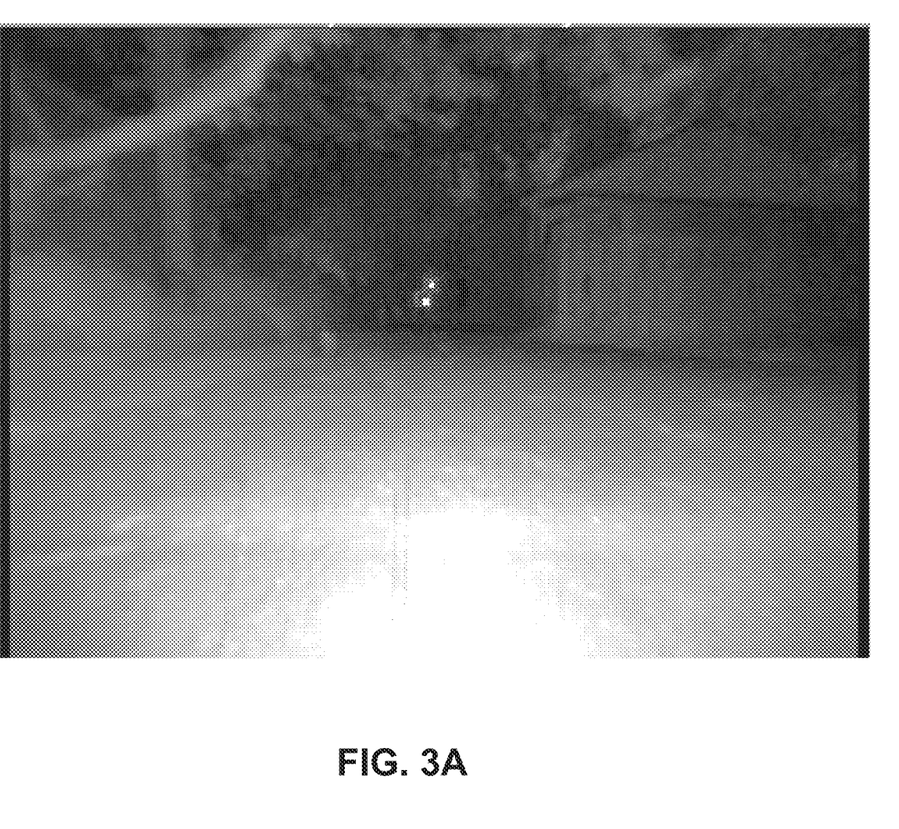
FIGS. 3A and 3B show example retro-reflector image captures.
Figure 3B:
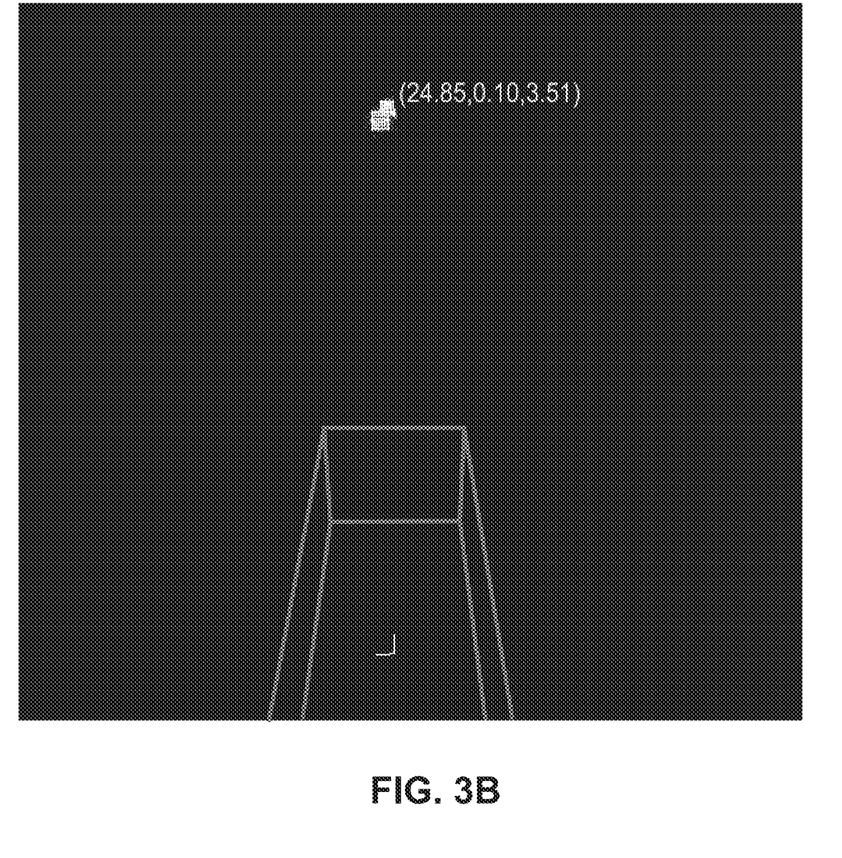

After applying saturation compensation, the retroreflectors on the bicycle become visible at a farther distance. In one of the bicycle capture data, the retroreflector was detected at ~25 m away, as FIGS. 3A and 3B show.

Use Grayscale Image Information

Figure 2A:
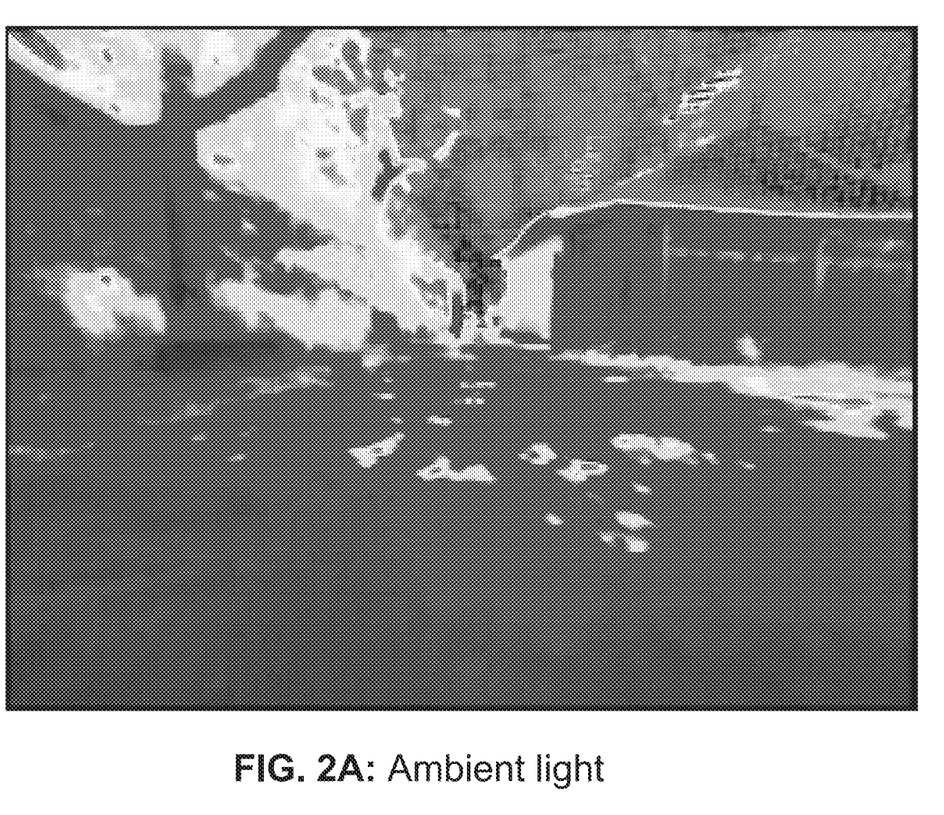
FIG. 2A is an example ambient image.
Figure 2B:
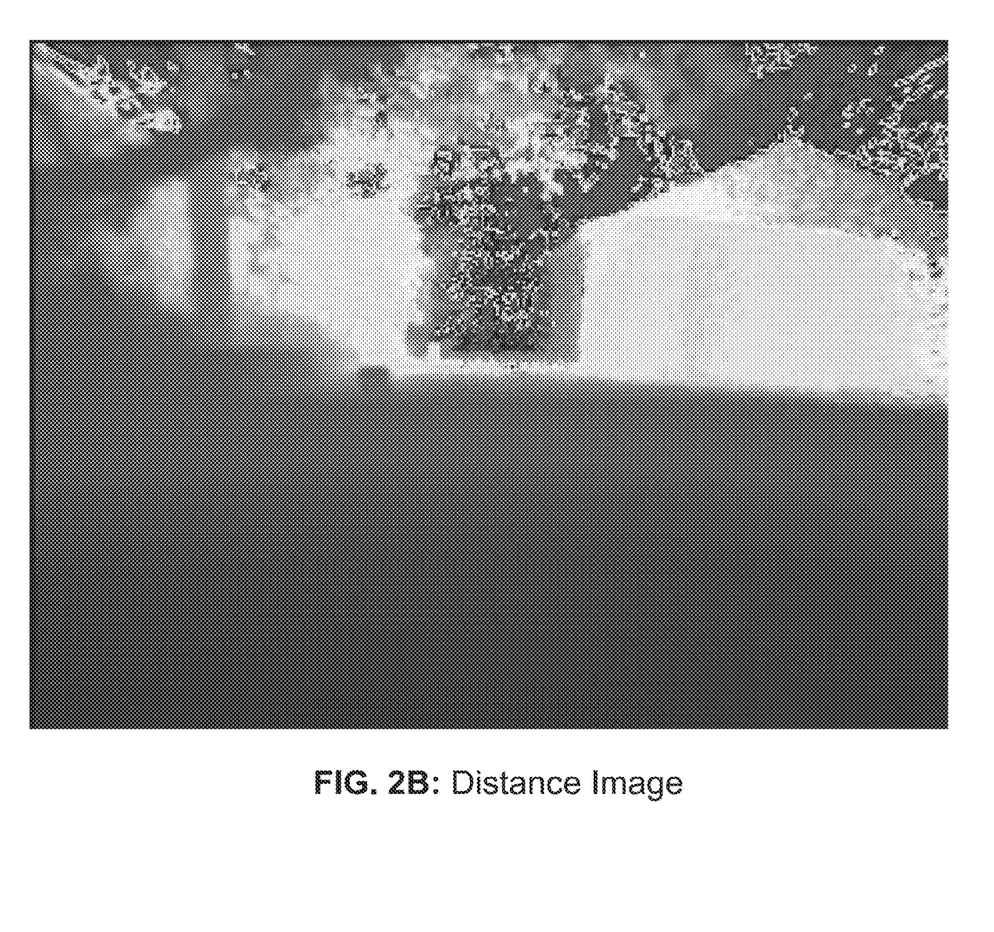
FIG. 2B is an example distance image.

The FIG. 2A ambient (grey-scale) image provides better visual than the distance image (an example of which is shown in FIG. 2B). Therefore, the ambient image can be fed into a pre-trained deep learning model for object detection tasks. It may be possible to identify the object class earlier than the object can be isolated from the distance image (point cloud).

The present technology also outputs the ambient (grayscale) image, and any general purpose pretrained object detection model can be applied to identify objects in the gray-scale image.

Saturation Compensation Method

Figure 4A:
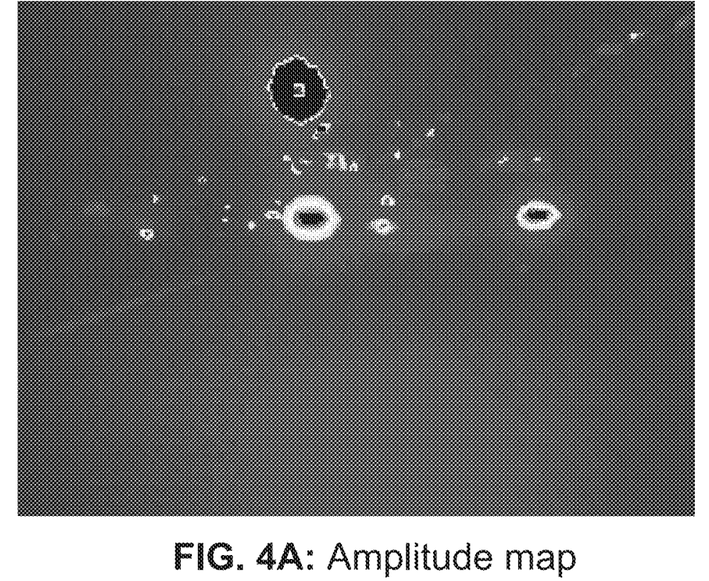
FIG. 4A shows an Amplitude map.
Figure 4B:
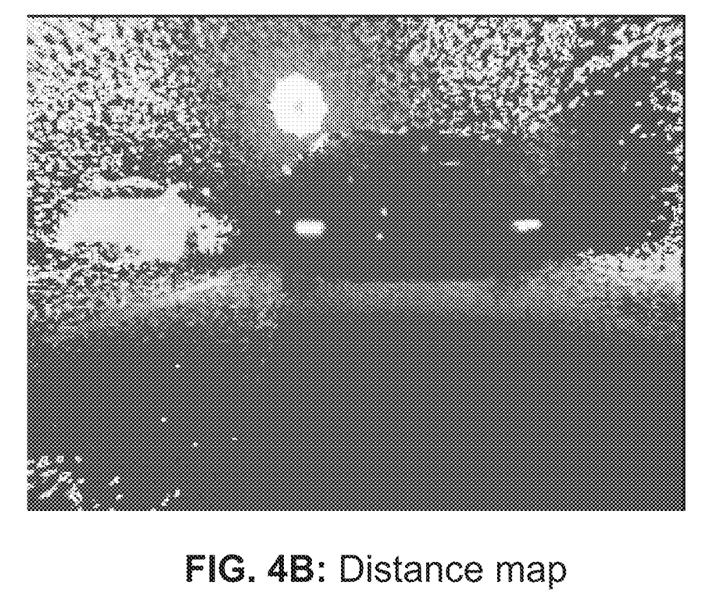
FIG. 4B shows a Distance map.
Figure 4C:
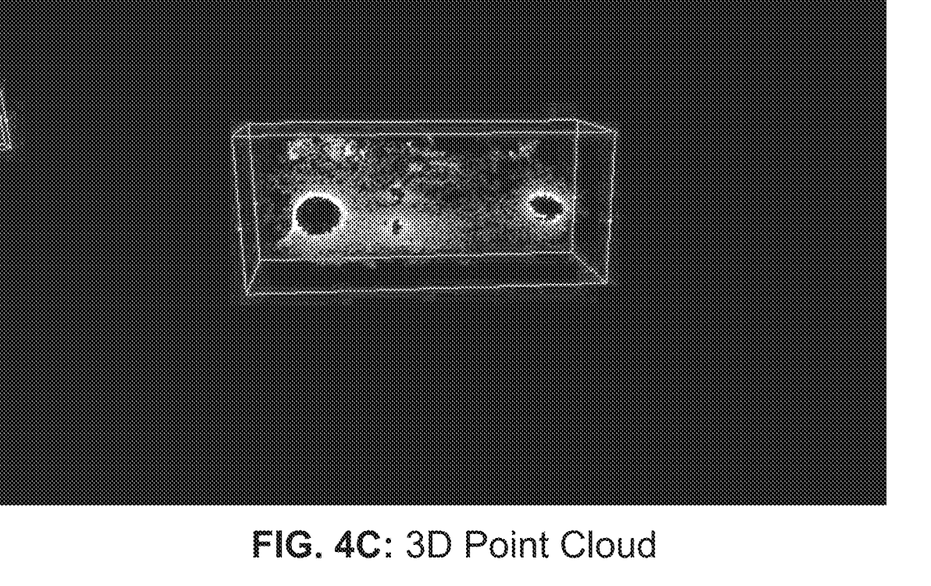
FIG. 4C shows a 3D Point Cloud.

Saturation compensation processes the raw amplitude (FIG. 4A) and distance (FIG. 4B) images and modifies the amplitude and distance values of the saturated pixels. The output is the modified amplitude and distance images, which will be used for generating 3D point clouds (FIG. 4C).

If the light intensity received by any pixels exceeds their capacity, the emitted and received phase shift cannot be accurately determined and thus the calculated distance will be inaccurate. FIGS. 4A-4C demonstrate that saturation occurs on the retroreflectors of the vehicle as well as on the sun. The amplitude on those regions is saturated (shown as black regions). The distance return is therefore not continuous with neighboring pixels, and appear on the point cloud display as hollow regions.

Figure 5:
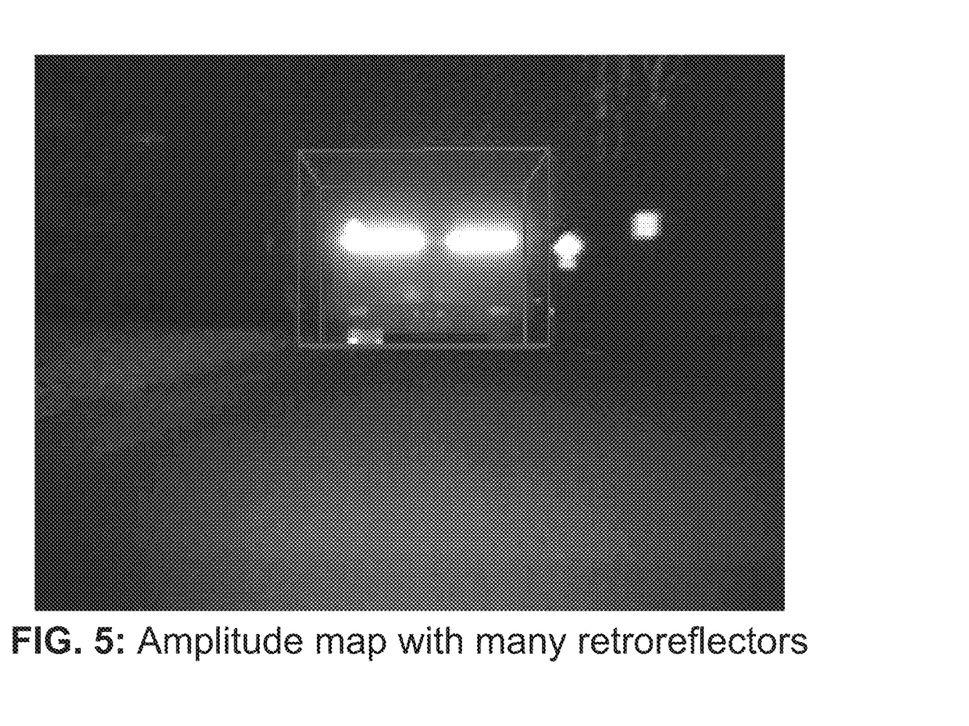
FIG. 5 shows an Amplitude map with many retroreflectors.
Figure 6:
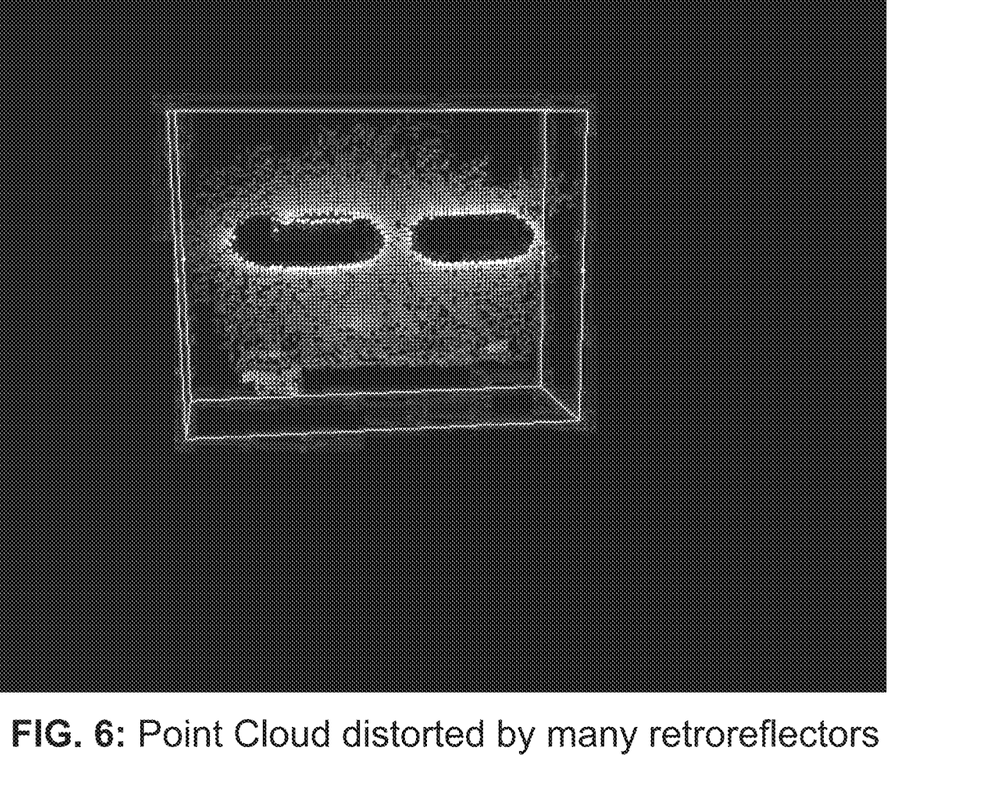
FIG. 6 shows a Point Cloud distorted by many retroreflectors.
Figure 7A:
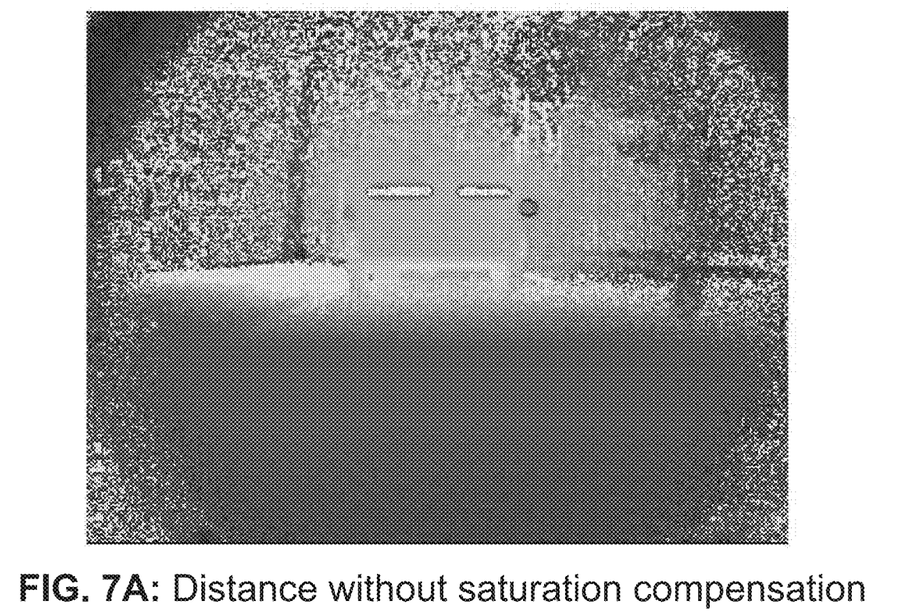
FIG. 7A shows Distance without saturation compensation.
Figure 7B:
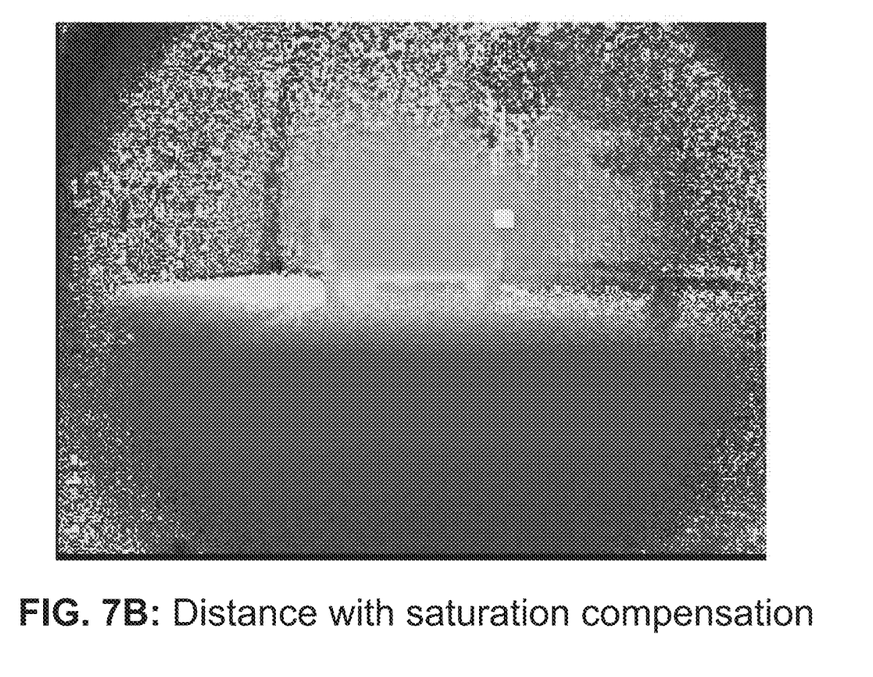
FIG. 7B shows Distance with saturation compensation.
Figure 8A:
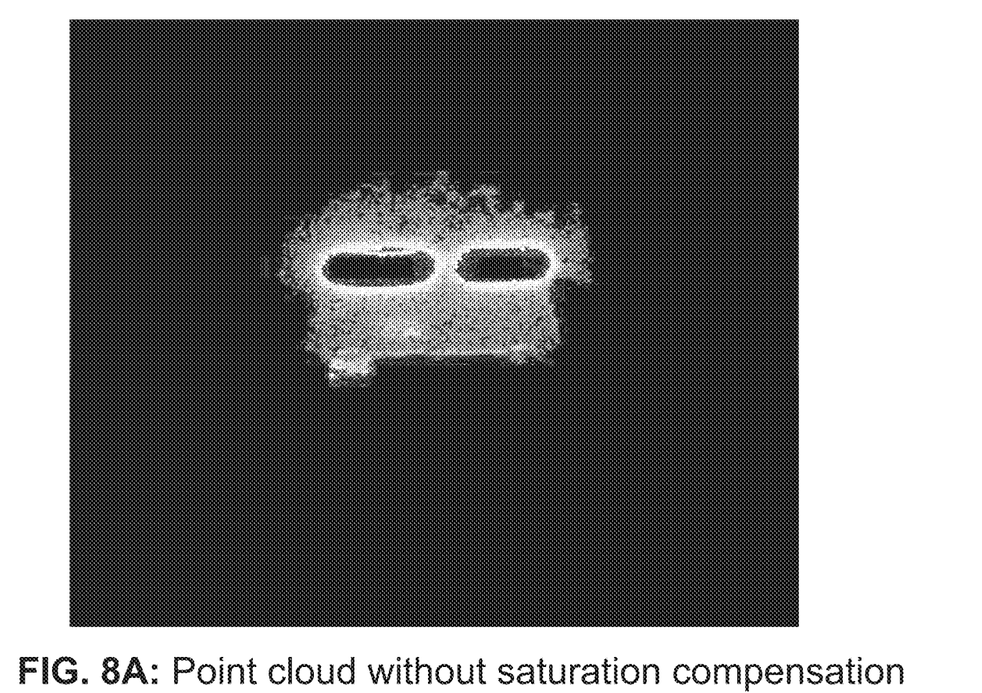
FIG. 8A shows a Point cloud without saturation compensation.
Figure 8B:
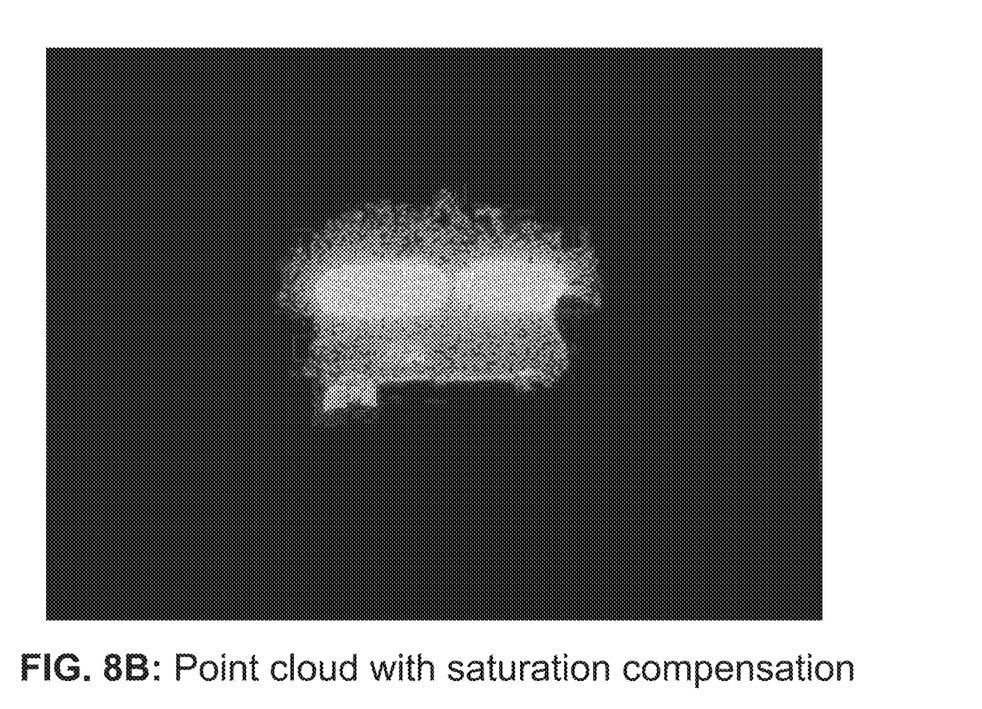
FIG. 8B shows a Point cloud with saturation compensation.

A main problem due to saturation is that it will disrupt the shape completeness of the observed object, especially when the object has a significant area covered by retroreflectors (as shown in FIG. 5 and FIG. 6). A purpose of the saturation compensation is to fill those hollow saturated spots with estimated distance values.

Figure 9:
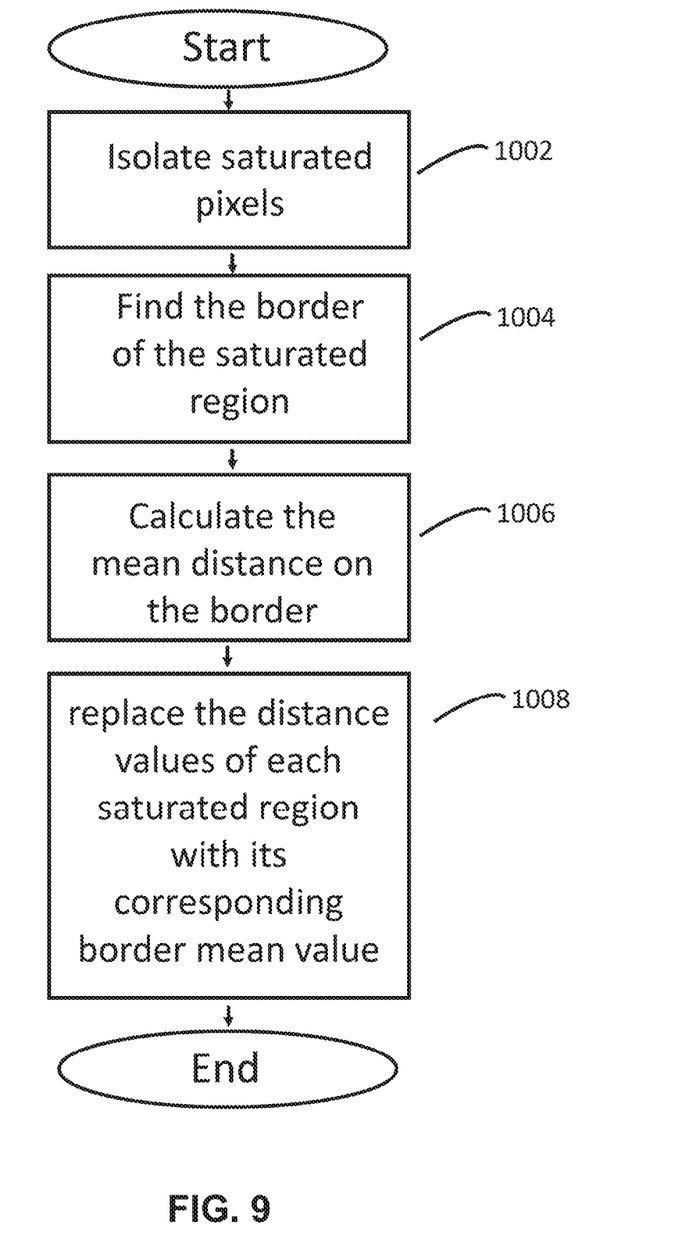
FIG. 9 is a flowchart.
Figure 10:
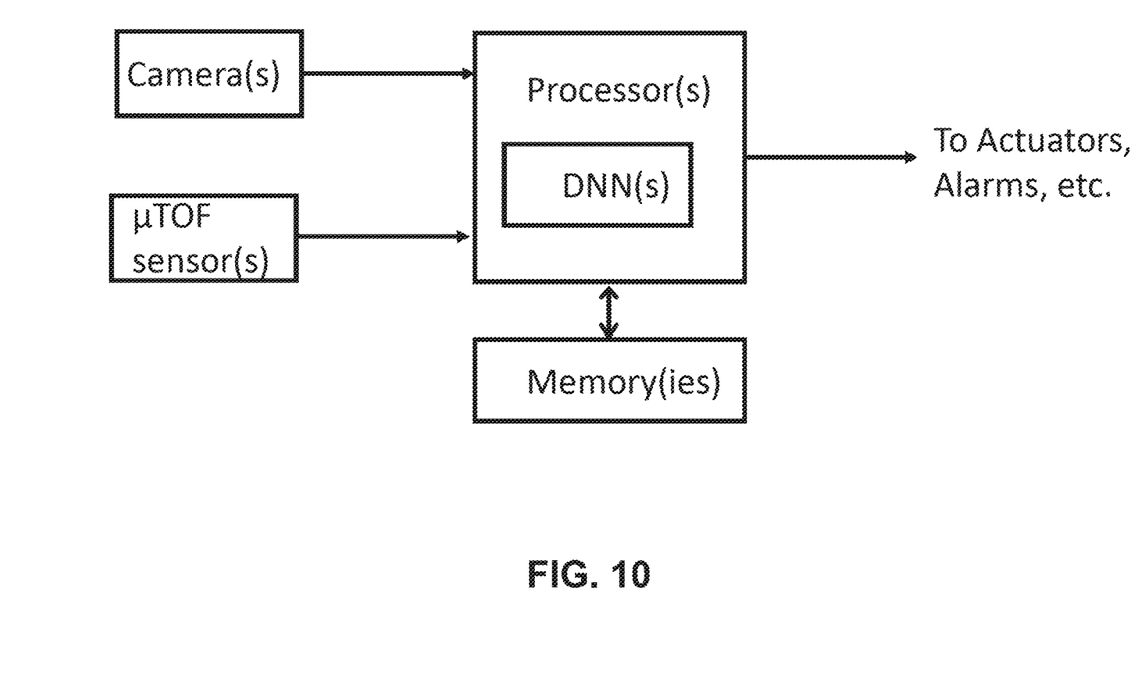
FIG. 10 is a schematic block diagram of an example system.

In one embodiment, the saturation compensation method consists of the following steps as shown in FIG. 9 and implemented by the hardware shown in FIG. 10:
1. Isolate the saturated pixels: find out all pixels with amplitude values greater than 2048 (or whatever the highest threshold value may be for a given sensor) (block 1002)
2. Find the border of the saturated region (block 1004)
3. Calculate the mean distance on the border (block 1006)
4. Replace the distance values of each saturated region with its corresponding border mean value (block 1008). The assumption here is that the saturated region should have similar distance with its unsaturated border region.

Two example object detection deep learning models may be used:

YOLOv5 ("You only look once") is an object detection algorithm that divides images into a grid system. Each cell in the grid is responsible for detecting objects within itself. YOLO is one of the most famous object detection algorithms due to its speed and accuracy. The output includes the bounding boxes, class names, and confidences of the detected objects in the image. It has several variants (YOLOv5s, YOLOv5m, YOLOv5l, etc), and each variant has its own pros/cons.

Masked-RCNN: it is a deep neural network (see FIG. 10) aimed to solve instance segmentation problem in machine learning or computer vision. It separates different objects in an image or a video, and returns the pixels each object occupies. The output includes the bounding boxes, class names, confidences, and the masks of all objects.

The preliminary results using NN model to detect a bicyclist may be as follows:

TABLE 3

Preliminary Results

| Model | Bicyclist Detection Range | Runtime |
|---|---|---|
| YOLOv5s | 15.0m | 102 fps |
| YOLOv5m | 15.0m | 76 fps |
| YOLOv5l | 19.6m | 50 fps |
| Masked-RCNN | 19.5m | 10 fps |

Combining Retroreflector and Ambient Image Information

By the processor combining the objects detected by retro-reflector method and neural-network method, the redundancy of the detection sources make the bicycle detection more reliable. The detection range can be summarized in the following table:

TABLE 4

Example Detection and Classification Ranges

| Data Source | Detection Range | Classification Range | Runtime |
|---|---|---|---|
| Retro-reflector approach | 25m | n/a | ~100 fps |
| neural-network approach (YOLOv5s) | 15m | 15m | ~100 fps |
| Combined | 25m | 15m | ~50 fps |

The combined method can detect an approaching object (with retro-reflectors) from 25 m away, and can identify the class of the object from 15 m away with a frame rate of ~50 fps.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method for detecting an object comprising:
generating, using at least one sensor, a first amplitude map including a first detection region indicating a retroreflector,
generating, using the at least one sensor, a raw point cloud including a second detection region indicating the retroreflector,
using at least one processor to perform operations comprising:
generating a merged point cloud based on the raw point cloud and the first amplitude map, the merged point cloud including corrected distance values in the second detection region, and
processing, using a deep learning model, the first amplitude map to classify an object of interest that includes the first detection region.

2. The method of claim 1, wherein the merged point cloud is generated by merging, using the at least one processor-, the first amplitude map a corrected point cloud including the corrected distance values.

3. The method of claim 2, wherein generating of the corrected point cloud includes inferring the corrected distance values based on distance values of pixels neighboring the second detection region.

4. The method of claim 2, wherein
the first detection region includes saturated pixels,
the second detection region includes corresponding pixels that correspond to the saturated pixels, and
generating of the corrected point cloud includes replacing distance values of the corresponding pixels with the corrected distance values.

5. The method of claim 4, wherein the corrected distance values are mean distance values of pixels that border the first detection region.

6. The method of claim 1, wherein the deep learning model divides the first amplitude map into a grid wherein each cell in the grid detects objects within itself.

7. The method of claim 1, wherein the deep learning model separates different objects in the first amplitude map and returns pixels of the first amplitude map that each object occupies.

8. The method of claim 1, wherein the operations further comprise detecting an approaching object based on i) the second detection region and ii) a classification of the object of interest.

9. The method of claim 1, wherein the first amplitude map comprises an image detected by a camera.

10. The method of claim 1, wherein the operations further comprise generating the merged point cloud with a cue of the retroreflector.

11. The method of claim 1, wherein the operations further comprise generating a second amplitude map, the generating of the second amplitude map including modifying amplitude values of the first amplitude map.

12. The method of claim 1, wherein
the object of interest is classified as a bicycle, and
the operations further comprise detecting the bicycle from a range of at least 20 meters based on the merged point cloud.

13. The method of claim 1, wherein the operations further comprise:
detecting a retroreflective surface of the retroreflector in the first amplitude map as a cue of the object of interest,
removing deleterious saturation effects caused by the retroreflective surface in the first amplitude map to generate a second amplitude map including the retroreflective surface,
merging the second amplitude map containing the object of interest with a corrected point cloud to generate the merged point cloud, and
determining at least one point of the merged point cloud that corresponds to the object of interest.

14. A system for detecting an object at increased range comprising:
at least one sensor configured to generate
a first amplitude map including a first detection region indicating a retroreflector, and
a raw point cloud including a second detection region indicating the retroreflector; and
at least one processor configured to perform operations comprising:
generating a merged point cloud based on the raw point cloud and the first amplitude map, the merged point cloud including corrected distance values in the second detection region, and
processing, using a deep learning model, the first amplitude map to classify an object of interest that includes the first detection region.

15. The system of claim 14, wherein the merged point cloud is generated by merging the first amplitude map a corrected point cloud.

16. The system of claim 15, wherein generating of the corrected point cloud includes inferring the corrected distance values based on distance values of pixels neighboring the second detection region.

17. The system of claim 15, wherein
the first detection region includes saturated pixels,
the second detection region includes corresponding pixels that correspond to the saturated pixels, and
generating of the corrected point cloud includes replacing distance values of the corresponding pixels with the corrected distance values.

18. The system of claim 17, wherein the corrected distance values are mean distance values of pixels that border the first detection region.

19. The system of claim 14, wherein the deep learning model is configured to divide the first amplitude map into a grid wherein each cell in the grid detects objects within itself.

20. The system of claim 14, wherein the deep learning model is configured to separate different objects in the first amplitude map and return pixels of the first amplitude map that each object occupies.

21. The system of claim 14, wherein the operations further comprise detecting an approaching object based on i.) the second detection region and ii.) a classification of the object of interest.

22. The system of claim 14, wherein the first amplitude map comprises an image detected by a camera.

23. The system of claim 14, wherein the operations further comprise generating the merged point cloud with a cue of the retroreflector.

24. The system of claim 14, wherein the operations further comprise generating a second amplitude map, the generating of the second amplitude map including modifying amplitude values of the first amplitude map.

25. The system of claim 14, wherein
the object of interest is classified as a bicycle, and
the operations further comprise detecting the bicycle from a range of at least 20 meters based on the merged point cloud.

26. The system of claim 14, wherein the operations further comprise:
detecting a retroreflective surface of the retroreflector in the first amplitude map as a cue of the object of interest,
removing deleterious saturation effects caused by the retroreflective surface in the first amplitude map to generate a second amplitude map including the retroreflective surface,
merging the second amplitude map containing the object of interest with the a corrected point cloud to generate the second point cloud, and
determining at least one point of the of the merged point cloud that corresponds to the object of interest.

* * * * *